United States Patent [19]

Canning, Jr.

[11] 4,284,428

[45] Aug. 18, 1981

[54] SEPARATION OF CONTAMINANT MATERIAL FROM COPPER WIRE AND CABLE

[75] Inventor: Everett J. Canning, Jr., Plainsboro, N.J.

[73] Assignee: Western Electric Co., Inc., New York, N.Y.

[21] Appl. No.: 201,891

[22] Filed: Oct. 29, 1980

[51] Int. Cl.³ ............................................. C22B 25/06
[52] U.S. Cl. ......................................... 75/64; 75/44 S; 75/63; 75/72; 75/85; 75/113; 134/2
[58] Field of Search .................... 75/44 S, 64, 113, 72, 75/63, 85; 134/2

[56] References Cited

U.S. PATENT DOCUMENTS

| | | | |
|---|---|---|---|
| 121,948 | 12/1871 | Lenning | 75/64 X |
| 155,368 | 9/1874 | Dechert | 75/113 X |
| 2,268,484 | 12/1941 | Hill | 75/64 |
| 2,891,881 | 6/1959 | Jaffe | 134/2 |
| 3,615,357 | 10/1971 | Wainer | 75/64 |
| 3,762,911 | 10/1973 | Crone | 75/63 |
| 3,853,543 | 12/1974 | Thomas | 75/72 |
| 3,866,893 | 2/1975 | Hoberman | 75/63 X |

*Primary Examiner*—M. J. Andrews
*Attorney, Agent, or Firm*—Joel F. Spivak

[57] ABSTRACT

Copper scrap from chopped and separated copper wire and cable is treated to remove contaminants still remaining on or mixed with the copper by sequential treatment, first in a sodium nitrate-postassium nitrate fused salt bath followed by a cuprous chloride fused salt bath.

6 Claims, No Drawings

SEPARATION OF CONTAMINANT MATERIAL FROM COPPER WIRE AND CABLE

TECHNICAL FIELD

This invention relates to the separation of contaminant materials from copper wire and cable. More particularly, it relates to the separation of the various insulating coatings, metal shielding and solder which is generally found on copper, wire and cable preliminary to fire refining.

BACKGROUND OF THE INVENTION

The recovery of copper from scrap copper wire and cable is of active interest in the telephone, cable and power industries. Generally, the scrapped wire or cable is first chopped into small pieces by a standard commercially available chopping machine, then the chopped copper wire or cable is placed on an air gravity table to separate the heavy material such as copper and other metals from the plastic insulating jacket, paper and fibrous materials. Thereafter, the recovered copper is refined by any one of the known copper refining techniques. In most instances, the preliminary separation of copper from the contaminants such as plastics, textiles, paper, and other metals is not complete. In order to enhance the efficiency of the final refining process it is preferable to further separate from the chopped copper those residual contaminants that are mixed therewith or lie on the surface of the copper.

In the past, a number of methods have been used to treat copper for the removal of certain contaminants. For example, U.S. Pat. No. 155,368 describes a method by which tin may be removed from the surface of copper shells by boiling the shells in an aqueous solution of calcium chloride. U.S. Pat. No. 3,762,911 describes the removal of lead, tin and zinc from the surface of high melting metal alloys such as copper-nickel alloy by heating the alloy in a vacuum so as to vaporize the impurities from the surface thereof. In U.S. Pat. No. 3,853,543 there is described a method for processing copper-bearing materials, such as copper scrap or ore, by first reacting the copper scrap or ore with a ferric chloride leaching agent to convert the copper to cuprous chloride, separating the cuprous chloride from the ferric chloride mixed therewith and then melting the cuprous chloride in the presence of zinc at 1100° C. to produce vaporized zinc chloride and molten copper. In U.S. Pat. No. 121,948, there is described a method of removing tin from the surface of tin plated metals such as iron or copper which involves treating the metal with a solution of caustic soda or potash. In U.S. Pat. No. 3,866,893 there is described an apparatus and method for desoldering scrap radiator cores and recovering separated metals. Here, the solder from the radiator cores is removed by means of a fused salt bath at temperatures of about 700° to 775° F. whereby the solder is sweated out of the radiator cores. This patent teaches that suitable fused salt baths comprise alkali metal salts such as fused sodium nitrate with a small amount (up to 1%) of sodium dichromate or a 50/50 mixture of sodium nitrate and potassium nitrate with the addition of small amounts of potassium chromate. While this method is suitable for removing many of the contaminants from the surface of copper scrap, the salt baths suggested in U.S. Pat. No. 3,866,893 do not adequately remove certain contaminants such as tin from the copper surface.

SUMMARY OF THE INVENTION

The novel process for removing contaminants from copper scrap such as chopped cable or wire comprises a two step treatment with fused salt compositions. In the first step, a fused salt mixture of sodium nitrate and potassium nitrate is heated to between 350° and 450° C. and previously separated copper scrap is chopped and added to this mixture. This scrap is maintained in contact with the mixture for a time sufficient to allow non-metallic contaminants such as plastic, paper and fibers, mixed with or adherent to the copper, to burn away allowing the copper to sink to the bottom of the fused salt bath while also causing any lead on the surface of the copper and present as lead particles mixed with the copper to melt, whereby the molten lead thus formed surprisingly does not wet the copper surface. In the case of aluminum which may be present as a contaminant, such as due to aluminum shielding or the like, the aluminum floats on the top of the bath and may be skimmed therefrom. The copper is then separated from this fused salt bath and the contaminants removed thereby and placed in another fused salt bath comprising a major proportion of cuprous chloride and potassium chloride in the same temperature range as the prior molten salt bath. This salt bath causes rapid removal of any tin contamination from the chopped copper by a replacement reaction wherein the tin is oxidized to stannous chloride by the cuprous chloride which in turn is reduced so as to form metallic copper. The stannous chloride is released as a gas.

DETAILED DESCRIPTION

In the recovery of copper from wire and cable, the wire and cable must be treated by several processes to remove the contaminants from the copper which is finally refined, for example, in a fire refining furnace.

Typical methods of treating wire and cable scrap to recover copper are: (1) chopping the wire and cable to liberate the copper from the plastic insulation followed by a gravity separation process; or (2) incineration of the wire and cable which burns the insulation from the copper. The chopping process followed by gravity separation is generally preferred over the incineration process for both economic and air quality standard reasons. In the chopping process, the copper wire and cable having insulation jackets such as polyethylene and polyvinyl chloride jackets, as well as individually insulated wires, are granulated into small pieces of approximately one eighth inch in length. The graulation process liberates most of the plastic insulation from the short lengths of copper wire. The mixture thus produced, which may also contain a small percentage of cable sheath components such as aluminum, steel and lead as well as other insulating materials such as paper and fiber, and solder components such as tin, lead and antimony, is fed into a gravity separation process. The separation may be achieved by a combination of air flow and mechanical vibration as in an air gravity table or a fluidizing medium which allows the copper, solder-coated copper and sheathing components to sink and the plastic, paper and fibers to float. The resultant copper is generally about 98% or more copper with a small percentage of plastic (0.5 to 1 weight percent) and solder and sheath components (up to about 1.5 weight percent). In order to process the chopped copper in a refining furnace, it is desirable to remove the small fraction of remaining plastic, paper, fiber, aluminum, steel, tin, antimony and lead which still remain with the copper. Repeating the gravity separation process is not a viable solution to this problem since this process does not separate the copper from the other metals and the residual plastic and other insulating material is usually in the form of unliberated short lengths of insulated wire which follow the copper since the density is closer to copper than platic.

In accordance with the present invention, the copper resulting from the aforementioned chopping and gravity separation is sequentially treated, first in a sodium nitrate-potassium nitrate fused salt bath system, then by treatment in a cuprous chloride salt bath. When steel or other magnetic components are also present as contaminants the salt bath treatments are combined with a magnetic separation as well. This overall process is very effective in removing essentially all residual contaminants carried with or on the surface of the chopped copper.

The first molten salt mixture preferably contains about 40% sodium nitrate and 60% potassium nitrate. This mixture is preferred since it is near the eutectic composition, melting at only 222° C. The molten salt mixture is heated in a tank which is inert to the mixture and will not contaminate the copper. A copper tank or stainless steel tank is suitable. Preferably, the tank contains a stainless steel or copper screen maintained at or near the bottom of the molten salt mixture for supporting the chopped copper as it falls to the bottom of the bath. The molten salt temperature is raised to a temperature of between 350° C. to 450° C., preferably about 400° C. during operation. At these temperatures the molten salt is fairly fluid. It is important that the molten salt temperature be kept above 327° C., the melting point of lead, in order to remove this contaminant from the copper. Scrap copper which has been prepurified by means of chopping and air gravature, as previously indicated, is then added to the molten salt mixture. A sufficient time is allowed for the plastic, paper or fiber impurities to burn away where they are preferably exhausted together with a recovery system for the salt vapors. As this happens, any copper which was surrounded by the plastic material and initially floated on the surface of the molten salt mixture, sinks to the bottom of the bath. At the same time any small pieces of aluminum which are generally present as aluminum flakes are found to float on top of the molten salt bath and are removed by a skimming operation. The tinned copper, lead and iron impurities sink to the bottom along with the pure copper. At the temperature of the bath, the lead becomes molten. It was surprisingly observed that the molten lead becomes coated with an adhering orange colored powder. It is believed that this powder is an oxide of lead which may aid in the prevention of the lead from wetting the copper, thereby enhancing the separation of the lead from the copper. However, the surface tension of the lead may be sufficient of itself to prevent wetting. After skimming of any aluminum flakes or other materials from the surface of the melt the molten salt is removed from the bottom of the tank, whereby the molten lead is removed therewith leaving the purified copper on the screen.

The purified copper may still contain tin as a contaminant thereon which must be removed. Also, the copper may also contain magnetic impurities such as iron. The magnetic impurities are removed by passing the copper through a magnetic field or having a magnet pass over a thin bed of the copper. The tin is then removed by placing the copper in a second molten salt bath comprising molten cuprous chloride at a temperature of about 400° C. When the copper is exposed to this bath, the cuprous chloride reacts by a replacement reaction with the tin on the surface of the copper replacing that tin with copper metal, the tin forming stannous chloride which vaporizes from the bath. The second bath tank preferably also contains a stainless steel, copper or other inert screening material to trap the copper, and the molten salt is removed from the bottom of the tank leaving the copper in the tank.

The copper remaining on the screen is free from contaminants on its surface or mixed therewith and is ready for further refining in a refining furnace. It is preferable to wash and dry the copper after treatment with each of the molten salt treatments and prior to fire refining so that salt from one bath is not carried into the second bath and so that the cuprous chloride salt is not carried into the refining furnace. The wash water from each bath can be collected to recover any salt from the baths by simple evaporation.

What is claimed is:

1. A process of removing contaminants from copper wire and cable scrap comprising the steps of:
   (a) adding the scrap to a molten fused salt bath consisting essentially of a mixture of sodium nitrate and potassium nitrate at a temperature of from 350° C.–450° C.;
   (b) maintaining the scrap in the molten nitrate bath for a time sufficient to burn away essentially all non-metallic contaminants;
   (c) separating all molten material from the remaining copper scrap;
   (d) treating the copper scrap in a bath containing molten cuprous chloride for a time sufficient to remove any tin impurities on the copper scrap; and
   (e) separating the decontaminated copper scrap from the molten cuprous chloride.

2. The method recited in claim 1 including the step of skimming the surface of the molten nitrate bath to remove contaminants on the surface thereof prior to its separation from the copper scrap.

3. The method recited in claim 1 or 2 including the step of washing the copper scrap to remove residual molten salt therefrom subsequent to separation of the scrap from each of said molten salt baths.

4. A process for removing contaminants from copper obtained from scrap wire and cable comprises:
   (a) chopping the scrap to a size so as to substantially free the insulating and shielding materials of the wire and cable from the copper;
   (b) substantially separating the less dense materials from the copper by means of air-gravity separation;
   (c) adding the separated copper portion to a molten alkali metal salt bath held at a temperature of from 350° C.–450° C.;
   (d) maintaining the scrap in the alkali metal salt bath for a time sufficient to burn away essentially all remaining non-metallic contaminants;
   (e) skimming the surface of the alkali metal salt bath;
   (f) separating all molten material including any molten lead from the copper scrap;
   (g) washing the copper scrap;
   (h) placing the copper scrap in molten cuprous chloride for a time sufficient to remove any tin from the copper; and
   (i) separating the molten cuprous chloride from the copper.

5. The process recited in claim 4 wherein the alkali metal salt bath consists essentially of a mixture of sodium and potassium nitrates in approximately eutectic mixture proportions.

6. The process recited in claim 4 wherein subsequent to separation from the cuprous chloride, the copper scrap is washed and then fire refined.

* * * * *